(12) United States Patent
Harada (10) Patent No.: US 9,409,812 B2
(45) Date of Patent: Aug. 9, 2016

(54) HEAT TREATMENT METHOD FOR SYNTHETIC QUARTZ GLASS

(71) Applicant: Shigeo Harada, Nagasaki (JP)

(72) Inventor: Shigeo Harada, Nagasaki (JP)

(73) Assignees: Heraeus Quarzglas GmbH & Co. KG, Hanau (DE); Shin-Etsu Quartz Products Co., Ltd., Tokyo (JP)

( * ) Notice: Subject to any disclaimer, the term of this patent is extended or adjusted under 35 U.S.C. 154(b) by 160 days.

(21) Appl. No.: 13/945,631

(22) Filed: Jul. 18, 2013

(65) Prior Publication Data

US 2014/0053608 A1 Feb. 27, 2014

(30) Foreign Application Priority Data

Aug. 27, 2012 (JP) .................. 2012-186392

(51) Int. Cl.
- *C03B 32/00* (2006.01)
- *C03B 25/00* (2006.01)
- *C03B 19/06* (2006.01)
- *C03B 19/14* (2006.01)

(52) U.S. Cl.
CPC .............. *C03B 32/00* (2013.01); *C03B 19/066* (2013.01); *C03B 19/1453* (2013.01); *C03B 25/00* (2013.01)

(58) Field of Classification Search
CPC ........ C03B 27/00; C03B 25/00; C03B 25/08; C03B 27/065; C03B 19/1453; C03B 19/066
USPC ......................................................... 65/117
See application file for complete search history.

(56) References Cited

U.S. PATENT DOCUMENTS 6,578,382 B2 * 6/2003 Ueda et al. ................. 65/30.1
7,007,510 B2   3/2006 Ueda et al.
7,691,748 B2   4/2010 Han (Continued)

FOREIGN PATENT DOCUMENTS

EP   1138640 A2   10/2001
EP   1211226 A2    6/2002

(Continued)

OTHER PUBLICATIONS

Espacenet English language abstract of JP H08-091857 A, published Apr. 17, 2008.

(Continued)

*Primary Examiner* — Alison L Hindenlang
*Assistant Examiner* — Mohamed K Ahmed Ali
(74) *Attorney, Agent, or Firm* — Tiajoloff & Kelly LLP (57) ABSTRACT

[Problem]
The provision of a synthetic quartz glass heat treatment method that can, by a single heat treatment, and without particular limitations on the OH group concentration distribution of the starting material, regulate the birefringence fast axis direction in the synthetic quartz glass after it has been heat-treated.
[Means of overcoming the problem]
A heat treatment method for synthetic quartz glass whereby columnar synthetic quartz glass having two opposing end faces and a lateral face is heat-treated covered with thermal insulator; wherein said heat treatment is performed using as end face thermal insulator which covers said two end faces, and as lateral face thermal insulator which covers said lateral face, thermal insulators that differ in at least either type or thickness to afford different thermal insulation effects such that the birefringence fast axis direction of said synthetic quartz glass is regulated.

9 Claims, 10 Drawing Sheets

(56) References Cited

U.S. PATENT DOCUMENTS

| | | | |
|---|---|---|---|
| 2002/0122902 A1* | 9/2002 | Ueda et al. | 428/34.4 |
| 2004/0112088 A1 | 6/2004 | Ueda et al. | |
| 2008/0079121 A1 | 4/2008 | Han | |
| 2008/0292882 A1* | 11/2008 | Agata | C03B 19/1453 428/402 |
| 2010/0148370 A1 | 6/2010 | Han | |
| 2012/0182622 A1* | 7/2012 | Takata | C03B 19/1453 359/639 |

FOREIGN PATENT DOCUMENTS

| | | |
|---|---|---|
| JP | 2002167227 A | 6/2002 |
| JP | 2005-239537 A | 9/2005 |
| JP | 2007-223888 A | 9/2007 |
| JP | 2007-223889 A | 9/2007 |
| JP | H08-091857 A | 4/2008 |
| JP | 2009-298670 A | 12/2009 |
| JP | H11-011965 A | 1/2011 |
| JP | 2011-213561 A | 10/2011 |

OTHER PUBLICATIONS

Espacenet English language abstract of JP H11-011965 A, published Jan. 20, 2011.

Espacenet English language abstract of JP 2009-298670 A, published Dec. 12, 2009.

Espacenet English language abstract of JP 2007-223888 A, published Sep. 6, 2007.

Espacenet English language abstract of JP 2007-223889 A, published Sep. 6, 2007.

Espacenet English language abstract of JP 2002167227 A, published Jun. 11, 2002.

* cited by examiner

HEAT TREATMENT METHOD FOR SYNTHETIC QUARTZ GLASS

TECHNICAL FIELD

The present invention relates to a heat treatment method for synthetic quartz glass for optical use and the like.

PRIOR ART

Photolithography technology is used in exposure apparatus for the manufacture of semiconductor integrated circuits. With the recent miniaturization and high integration of semiconductor integrated circuits, shorter wavelength light sources are being used for exposure. At present, optical members for exposure apparatus that use ArF excimer lasers (wavelength 193.4 nm) must meet requirements such as high homogeneity, high transparency, and high laser resistance.

High purity synthetic quartz glass is used as optical member material that meets these strict requirements. When improving homogeneity and decreasing birefringence in the synthetic quartz glass manufacturing process, heat treatment (annealing treatment) is a common manufacturing method performed to eliminate warp.

For example, annealing silica glass in a container or in powder, or plate-covered, is described in Patent document 1. Also, housing powder in a container, embedding the optical synthetic quartz glass product in the powder and annealing is described in Patent document 2.

Also, making the temperature variation in the optical axis direction less than the temperature variation in the direction orthogonal to the optical axis during a synthetic quartz glass block heating process, in order to manufacture synthetic quartz glass with a smaller distribution of birefringence values in the direction orthogonal to the optical axis, is described in Patent document 3.

Also, a heat treatment method to eliminate warp and purify synthetic silica glass bodies, where the entire external surface of the item to be treated is coated by contact with high purity $SiO_2$ powder, and then heat-treated, is described in Patent document 4.

However, even when a common known heat treatment for warp elimination is employed, there are disadvantages in that in exposure apparatus that use a plurality of optical members, the birefringences of each optical member accumulate, and high birefringence forms in the apparatus as a whole.

With regard to this, for example, it is explained in Patent document 5, and in Patent document 6 and Patent document 7, that the birefringence of the whole is decreased by using two different types of synthetic quartz glass (A and B). That is, when the birefringence (birefringence phase difference) of the two types of synthetic quartz glass A and B are the same, and the distribution is such that the fast axis directions are at right angles to each other, the fast axis of synthetic quartz glass A is in the same direction as the slow axis of synthetic quartz glass B (orthogonal to the fast axis), and so the birefringence effects of the two types of synthetic quartz glass cancel out and the cumulative birefringence corresponds to zero.

PRIOR ART DOCUMENTS

[Patent document 1] Japanese unexamined patent (1996) H08-091857
[Patent document 2] Japanese unexamined patent (1999) H11-011965
[Patent document 3] Japanese unexamined patent 2009-298670
[Patent document 4] Japanese unexamined patent 2011-213561
[Patent document 5] Japanese unexamined patent 2005-239537
[Patent document 6] Japanese unexamined patent 2007-223888
[Patent document 7] Japanese unexamined patent 2007-223889

SUMMARY OF THE INVENTION

Problem to be Solved by the Invention

Although, as described above, a method to regulate the direction of the birefringence fast axis (also referred to simply as "fast axis") of synthetic quartz glass is important, a method that can achieve such regulation has not been satisfactorily established. Respective individual problems remain with the method of Patent document 5, and with the method of Patent document 6 and Patent document 7.

In Patent document 5, a standard annealing treatment and a second annealing treatment are necessary in order to create quartz glass with two fast axis directions. That is, it requires standard annealing in one direction only (where the fast axis is arranged tangentially to the longitudinal axis of the cylinder), and a second annealing treatment comprising a standard annealing treatment in another direction (in a radial direction to the longitudinal axis of the cylinder).

In the methods of Patent document 6 and Patent document 7 there are stipulations regarding the OH group concentration distribution in the synthetic quartz glass starting material, and two types of fast axis quartz glass are created separately by separating synthetic quartz glass according to its OH group concentration distribution.

In the method of Patent document 5, there are two types and two stages of annealing means, and in the methods of Patent document 6 and Patent document 7 there is no adjustment of the birefringence in the processes that follow creation of the starting material: they are disadvantageous because they are unsatisfactory with regard to these two points.

In view of these disadvantages, the aim of the present invention is to provide a synthetic quartz glass heat treatment method that can, by a single heat treatment, and without particular limitations on the OH group concentration distribution of the starting material, regulate the birefringence fast axis direction in synthetic quartz glass after it has been heat-treated.

Means of Solving the Problem

In order to solve the abovementioned problem, the present invention provides a heat treatment method for synthetic quartz glass whereby columnar synthetic quartz glass having two opposing end faces and a lateral face is heat-treated covered with thermal insulator: wherein said heat treatment is performed using as end face thermal insulator which covers said two end faces, and as lateral face thermal insulator which covers said lateral face, thermal insulators that differ in at least either type or thickness to afford different thermal insulation effects such that the birefringence fast axis direction of said synthetic quartz glass is regulated.

With such a heat treatment method for synthetic quartz glass it is possible, by a single heat treatment, and without particular limitations on the OH group concentration distribution of the starting material, to regulate the birefringence fast axis direction in synthetic quartz glass after it has been heat-treated.

With the inventive heat treatment method for synthetic quartz glass, the birefringence fast axis direction of said synthetic quartz glass can be regulated in the radial direction of said end face by making the thermal insulation effect of said end face thermal insulator smaller than the thermal insulation effect of said lateral face thermal insulator.

With the inventive heat treatment method for synthetic quartz glass, the birefringence fast axis direction of said synthetic quartz glass can be regulated in the tangential direction of said end face by making the thermal insulation effect of said end face thermal insulator greater than the thermal insulation effect of said lateral face thermal insulator.

Thus with the inventive heat treatment method for synthetic quartz glass it is possible to regulate the birefringence fast axis direction to the radial direction of the end face, or to the tangential direction of the end face.

Also, in the inventive heat treatment method for synthetic quartz glass, said the thermal insulator is preferably a quartz glass container that can house said synthetic quartz glass.

In such cases, also, $SiO_2$ powder or $SiO_2$ fibers can be packed inside said quartz glass container.

With such a thermal insulator it is easy to adjust the thermal insulation effect around the synthetic quartz glass.

Also, the present invention provides a heat treatment method where a plurality of synthetic quartz glass is prepared, and heat-treated simultaneously by the abovementioned synthetic quartz glass heat treatment method, using the same heat treatment oven for said plurality of synthetic quartz glass; wherein, by performing the heat treatment with said end face thermal insulator and lateral face thermal insulator for at least one of said plurality of synthetic quartz glass arranged so as to have thermal insulation effects that differ from those of said end face thermal insulator and lateral face thermal insulator for the other synthetic quartz glass, the birefringence fast axis direction of at least one of said plurality of synthetic quartz glass is regulated in a different direction to that of said other synthetic quartz glass.

Thus with the present invention is possible to create a plurality of synthetic quartz glass having different birefringence fast axis directions even when heat-treating a plurality of synthetic quartz glass simultaneously using the same heat treatment oven.

Also, with the inventive synthetic quartz glass heat treatment method, the synthetic quartz glass for said heat treatment can be optical synthetic quartz glass to be used for optical systems in exposure apparatus.

In the present invention, the birefringence fast axis direction can be regulated, and so optical synthetic quartz glass is suitable as the synthetic quartz glass to be heat-treated.

Advantages of the Invention

With the inventive synthetic quartz glass heat treatment method it is possible, by a single heat treatment, and without particular limitations on the OH group concentration distribution of the starting material, to regulate the birefringence fast axis direction in the synthetic quartz glass after it has been heat-treated. Thus, for example, it is possible to simply and reliably obtain two types of synthetic quartz glass with different birefringence fast axis directions. Also, with the present invention, by using the same heat treatment temperature program it is possible to heat-treat a plurality of synthetic quartz glass in the same oven, and so production process efficiency is good. Moreover, as a result, synthetic quartz glass having two birefringence fast axis directions can be made in the same oven and the same batch, which is also efficient.

MODE OF THE INVENTION

The inventive synthetic quartz glass heat treatment method is described in detail below with reference to the figures.

Figure 1:
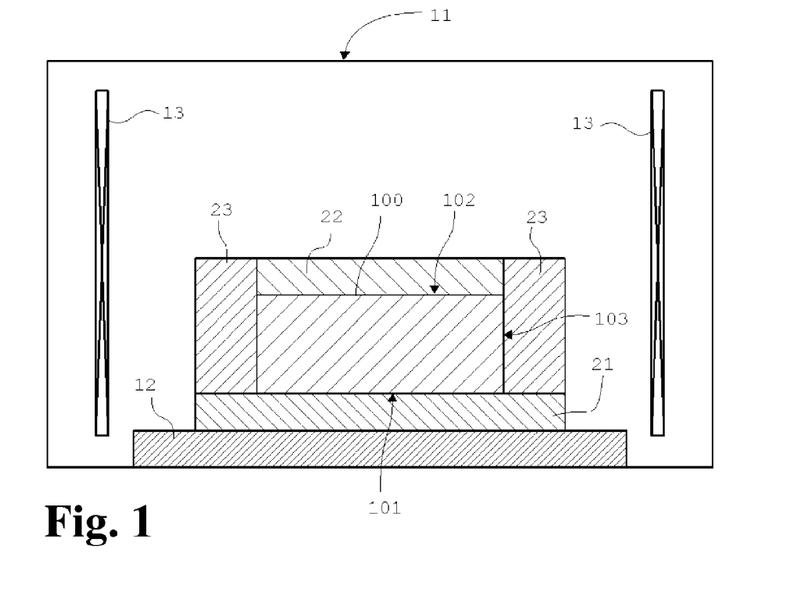
FIG. 1 is a simple cross-section view of a configuration example of a heat treatment oven that can be used in the inventive synthetic quartz glass heat treatment method.

FIG. 1 shows a configuration example of a heat treatment oven that can be used for the inventive synthetic quartz glass heat treatment method.

Synthetic quartz glass (shaped item of synthetic quartz glass) 100 is heat-treated inside heat treatment oven (air oven) 11. Synthetic quartz glass 100 to be heat-treated is columnar, having two opposing end faces 101, 102, and lateral face 103. The present invention is particularly suitable when the synthetic quartz glass 100 to be heat-treated is optical synthetic quartz glass for use in optical systems in exposure apparatus. It is particularly suitable for optical members for optical apparatus that utilize ultraviolet wavelengths of 250 nm or shorter.

Oven member 12 which positions synthetic quartz glass 100, and heater 13 which heats synthetic quartz glass 100, are provided inside heat treatment oven 11. When synthetic quartz glass 100 is heat-treated, thermal insulator covers synthetic quartz glass 100. In the present invention, heat treatment is performed using thermal insulators that differ in at least either type or thickness as end face thermal insulator which covers the two end faces 101, 102, and lateral face thermal insulator which covers lateral face 103, of synthetic quartz glass 100, to afford different thermal insulation effects.

FIG. 1 depicts when the thermal insulator that covers synthetic quartz glass 100 is a quartz glass container that can house the synthetic quartz glass. The quartz glass container comprises bottom thermal insulator 21, top thermal insulator 22, and ring-shaped thermal insulator 23. Here, the "end face thermal insulator" comprises bottom thermal insulator 21 and top thermal insulator 22, and the "lateral face thermal insulator" is ring-shaped thermal insulator 23. The quartz glass container may be synthetic quartz glass or natural quartz glass. Synthetic quartz glass has higher purity and is therefore preferred. In FIG. 1, ring-shaped thermal insulator 23 is thicker than top thermal insulator 22 and bottom thermal insulator 21. Obviously, these thicknesses can be reversed.

Figure 2:
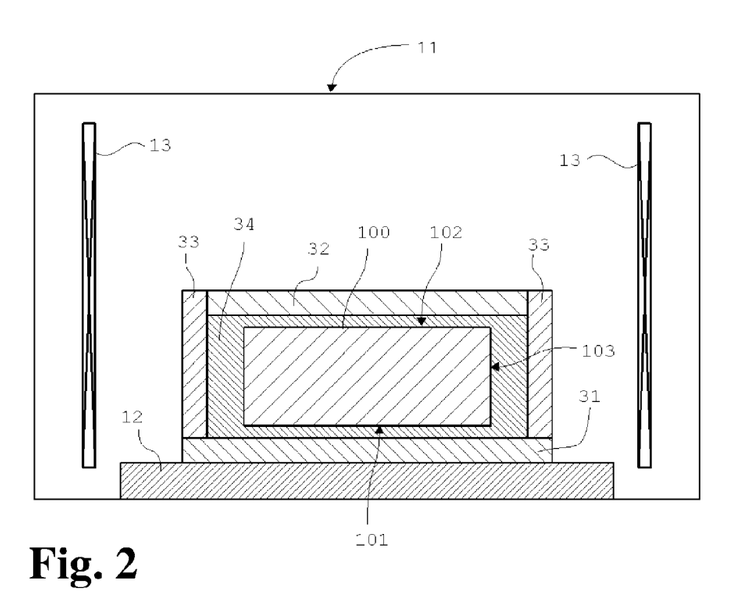
FIG. 2 is a simple cross-section view of another configuration example of a heat treatment oven that can be used in the inventive synthetic quartz glass heat treatment method.

FIG. 2 depicts the use of packing thermal insulator 34 in the gap between synthetic quartz glass 100 and the inside of the quartz glass container (bottom thermal insulator 31, top thermal insulator 32, ring-shaped thermal insulator 33) that can house the synthetic quartz glass. Packing thermal insulator 34 can be $SiO_2$ powder or $SiO_2$ fibers. The powder or fibers may be synthetic quartz glass, or $SiO_2$ crystalline powder, primarily crystal powder. Synthetic quartz glass has higher purity and is therefore preferred. Natural quartz glass and $SiO_2$ crystalline powder that have been obtained at high purity by heating in an HCl atmosphere are also preferred, for the same reason. Here, one "end face thermal insulator" comprises bottom thermal insulator 31 plus the part of packing thermal insulator 34 that covers end face 101 on the underside of synthetic quartz glass 100, and the other one comprises top thermal insulator 32 plus the part of packing thermal insulator 34 that covers end face 102 on the topside of synthetic quartz glass 100. Also, "lateral face thermal insulator" is ring-shaped thermal insulator 33 plus the part of packing thermal insulator 34 that covers lateral face 103 of synthetic quartz glass 100. Thus in FIG. 2, the part of packing thermal insulator 34 that covers lateral face 103 of synthetic quartz glass 100 is thicker than the parts that cover end faces 101, 102; this can be reversed.

The synthetic quartz glass birefringence fast axis direction can be regulated by heat-treating as shown in FIG. 1 or FIG. 2. A known temperature program for eliminating warp in synthetic quartz glass can be used as the heat treatment temperature program (temperature profile).

More specifically, the synthetic quartz glass birefringence fast axis direction can be regulated in the end face radial direction by making the thermal insulation effect of the end face thermal insulator smaller than the thermal insulation effect of the lateral face thermal insulator. Also, the synthetic quartz glass birefringence fast axis direction can be regulated in the end face tangential direction by making the thermal insulation effect of the end face thermal insulator greater than the thermal insulation effect of the lateral face thermal insulator. It is not necessarily clear why it is possible to regulate synthetic quartz glass birefringence fast axis direction by adjusting the thermal insulation effect of the thermal insulators that cover the synthetic quartz glass; the following is inferred. Generally, quartz glass shrinks in volume (increases in density) if cooled rapidly, and increases in volume (decreases in density) if cooled slowly, from a temperature zone below a certain temperature. If there is a smaller thermal insulation effect at the end faces and a greater thermal insulation effect at the lateral face of the synthetic quartz glass, the cooling from the end face part predominates, and so cooling in the radial direction is slow, stress acts to expand at each point in the radial direction, and the birefringence fast axis is distributed readily in the radial direction. Conversely, if there is a greater thermal insulation effect at the end faces and a smaller thermal insulation effect at the lateral face of the synthetic quartz glass, the cooling from the lateral face part predominates and so there is rapid cooling from the lateral part, with the result that stress acts to contract at each point in the radial direction, and the birefringence fast axis is distributed readily in the tangential direction.

The proportion of thermal insulation effect due to end face thermal insulator to thermal insulation effect due to lateral face thermal insulator is preferably around 2-5 times. However, it can also be adjusted to outside this range if the birefringence value (phase difference) is high.

Figure 3:
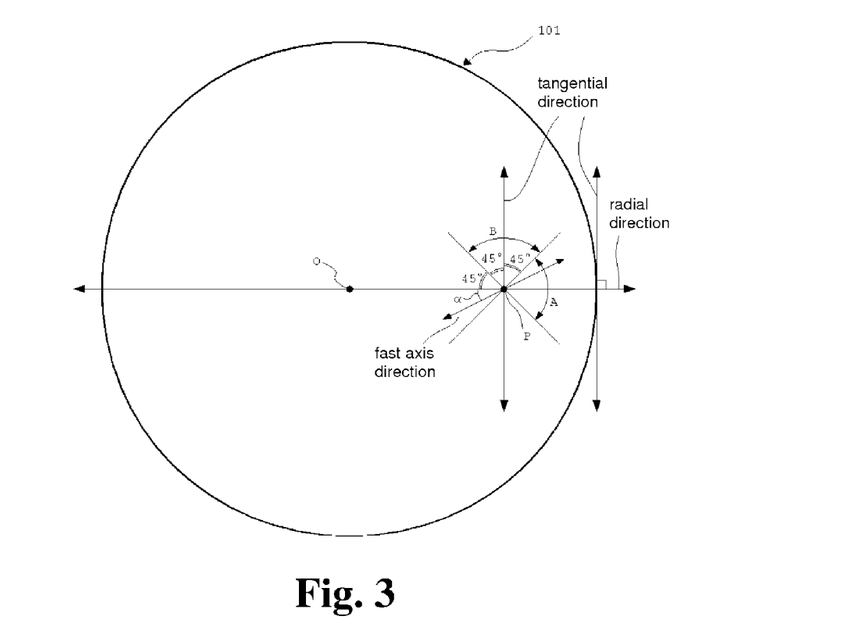
FIG. 3 is a diagram to illustrate the definition of birefringence fast axis direction in synthetic quartz glass.

The birefringence fast axis direction in synthetic quartz glass 100 is described with reference to FIG. 3. FIG. 3 is a diagram of an end face of synthetic quartz glass 100. The "end face radial direction", also referred to as the "radiation direction", is the direction from the end face center O to the evaluation point P at which the birefringence fast axis is evaluated. The "end face tangential direction", also referred to as the "concentric direction", is the direction orthogonal to the radial direction of the end face at evaluation point P.

In FIG. 3, angle range A is the range from −45° to +45° to the end face radial direction. This range is in directions near the radial direction. Angle range B, however, is in the direction from −45° to +45° to the end face tangential direction that is, from +135° to +45° or from −45° to −135° to the radial direction). This range is in directions near the tangential direction. FIG. 3 shows an example where angle α formed between the birefringence fast axis direction and the radial direction is in angle range A (from −45° to +45° to the radial direction).

With the present invention, a plurality of synthetic quartz glass can be heat-treated simultaneously using the same heat treatment oven by preparing a plurality of synthetic quartz glass and adopting the abovementioned synthetic quartz glass heat treatment method. Heat-treating a plurality of synthetic quartz glass simultaneously affords good manufacturing process efficiency.

With the present invention, also, a plurality of synthetic quartz glass having different birefringence fast axis directions can be created even when the plurality of synthetic quartz glass is heat-treated simultaneously using the same heat treatment oven. Specifically, when a plurality of synthetic quartz glass is heat-treated simultaneously using the same heat treatment oven, the heat treatment is performed with end face thermal insulator and lateral face thermal insulator for at least one synthetic quartz glass (synthetic quartz glass a) arranged so as to have thermal insulation effects that differ from those of end face thermal insulator and lateral face thermal insulator for the other synthetic quartz glass (synthetic quartz glass b). Thus the birefringence fast axis direction of synthetic quartz glass a can be regulated to a different direction to that of synthetic quartz glass b. This allows synthetic quartz glass having two birefringence fast axis directions to be manufactured in the same oven in the same batch, which is efficient.

Embodiments

The present invention is described in more detail below with reference to embodiments of the present invention and comparative examples; the present invention is not limited by these.

Conditions Common to Embodiments 1 to 4

A lump of the required weight was cut from quartz glass parent material of external diameter 150 mm or greater, and melted, compressed and shaped using a carbon mould to obtain smooth, columnar synthetic quartz glass 100 of dimensions external diameter 350 mm, thickness 70 mm. The resulting synthetic quartz glass 100 was heat-treated (annealing treatment) in heat treatment oven (air oven) 11 provided with heater 13, etc. as shown in FIG. 2, under different conditions according to Embodiments 1 to 4.

Quartz glass containers that could house the smooth columnar synthetic quartz glass were used in this annealing treatment. These comprised disk-shaped bottom thermal insulator (bottom disk) 31, identical disk-shaped top thermal insulator (top disk) 32, and cylindrical ring-shaped thermal insulator 33, and were of various sizes as required according to the treatment conditions. The respective thermal insulators were used at thicknesses of 20 mm (bottom thermal insulator 31), 20 mm (top thermal insulator 32) and 20 mm (ring-shaped thermal insulator 33).

Also, SiO$_2$ powder (Iota powder manufactured by Unimin, particle size: to 400 μm, Al: to 30 ppm) was used as packing thermal insulator 34 in the gap between synthetic quartz glass 100 and the quartz glass container.

Figure 4:
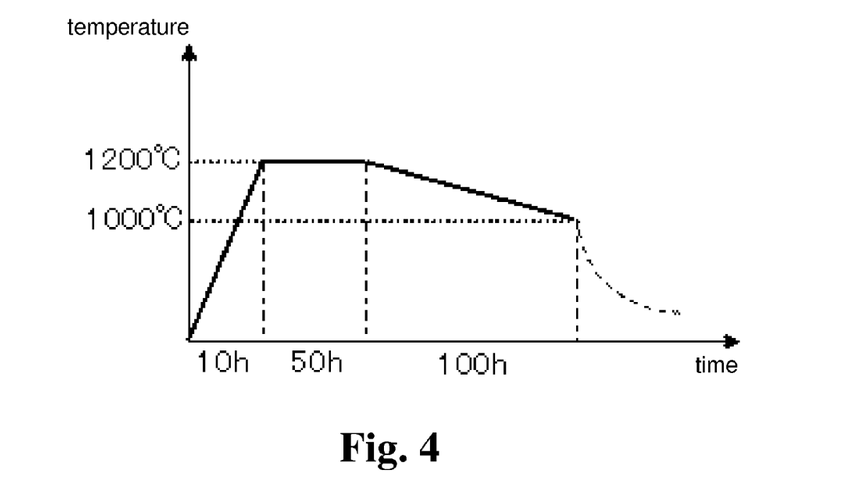
FIG. 4 is a graph showing the heat treatment temperature program in an embodiment.

The temperature program shown in FIG. 4 was used as the heat treatment temperature program. Specifically, this involved increasing the temperature to 1200° C. over a 10-hour period from the start of heating, then keeping the temperature at 1200° C. for 50 hours, and then decreasing the temperature to 1000° C. over a 100-hour period, after which heating using the heater was stopped, and the system was allowed to cool.

Embodiment 1

Synthetic quartz glass 100 of external diameter 350 mm and thickness 70 mm was housed in quartz glass ring-shaped thermal insulator 33 of internal diameter 540 mm, and quartz powder was packed to a thickness of 2 mm in the gap between synthetic quartz glass 100 topside end face (top face) 102 and top thermal insulator 32, to a thickness of 2 mm in the gap between underside end face (bottom face) 101 and bottom thermal insulator 31, and to a thickness of 95 mm in the gap between lateral face 103 and ring-shaped thermal insulator 33. As in heat treatment oven (air oven) 11 shown in FIG. 2, this was placed upon oven member 12 in the heat treatment oven and subjected to the abovementioned heat treatment.

Embodiment 2

Synthetic quartz glass 100 of external diameter 350 mm and thickness 70 mm was housed in quartz glass ring-shaped thermal insulator 33 of internal diameter 390 mm, and quartz powder was packed to a thickness of 20 mm in the gap between synthetic quartz glass 100 topside end face 102 and top thermal insulator 32, to a thickness of 20 mm in the gap between underside end face 101 and bottom thermal insulator 31, and to a thickness of 20 mm in the gap between lateral face 103 and ring-shaped thermal insulator 33. As in heat treatment oven (air oven) 11 shown in FIG. 2, this was placed upon oven member 12 in the heat treatment oven and subjected to the abovementioned heat treatment.

Figure 5:
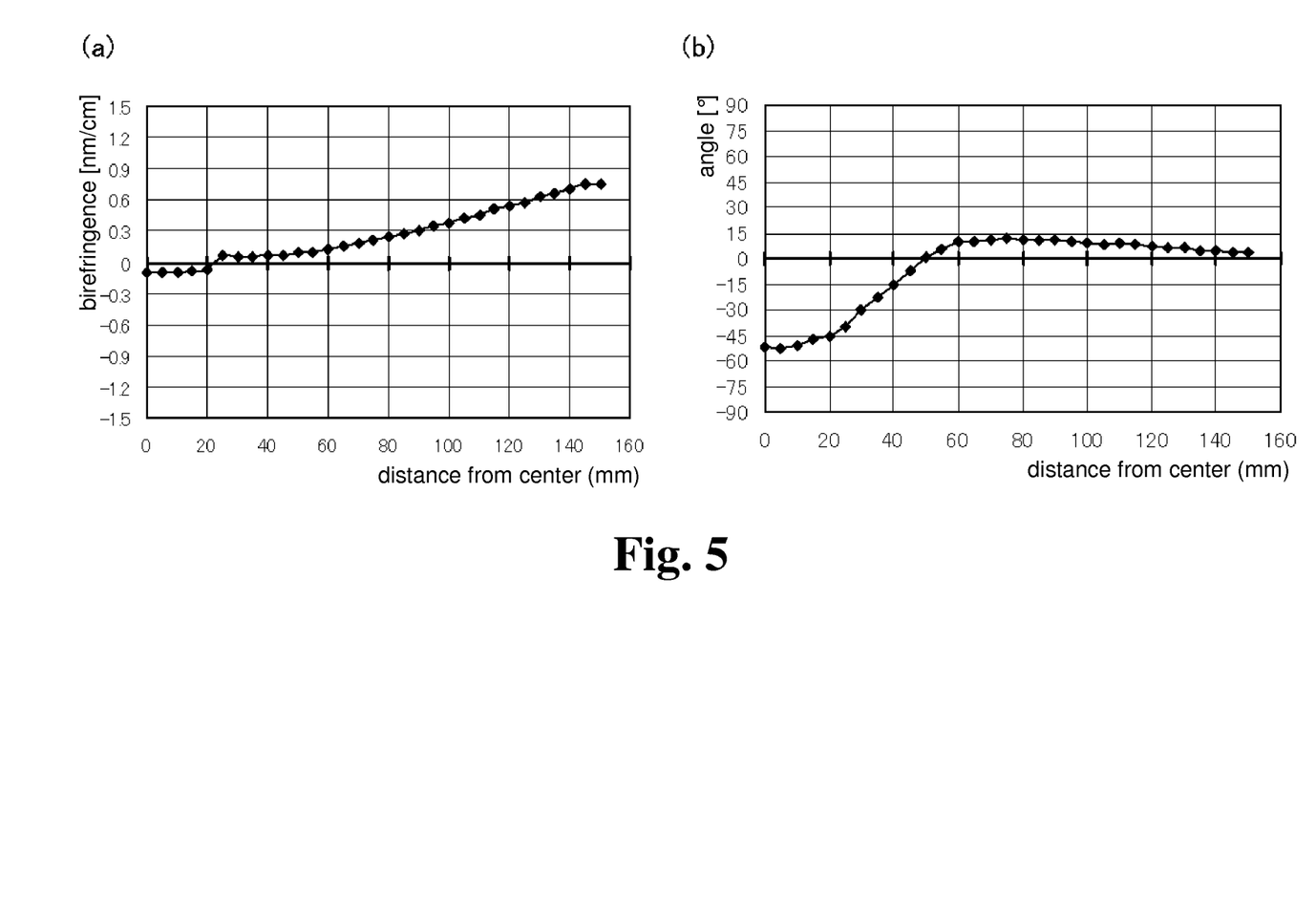
FIG. 5 comprises graph (a) showing the birefringence distribution along the radial direction of the end face, and graph (b) showing the birefringence fast axis angle distribution, in synthetic quartz glass heat-treated in Embodiment 1.
Figure 6:
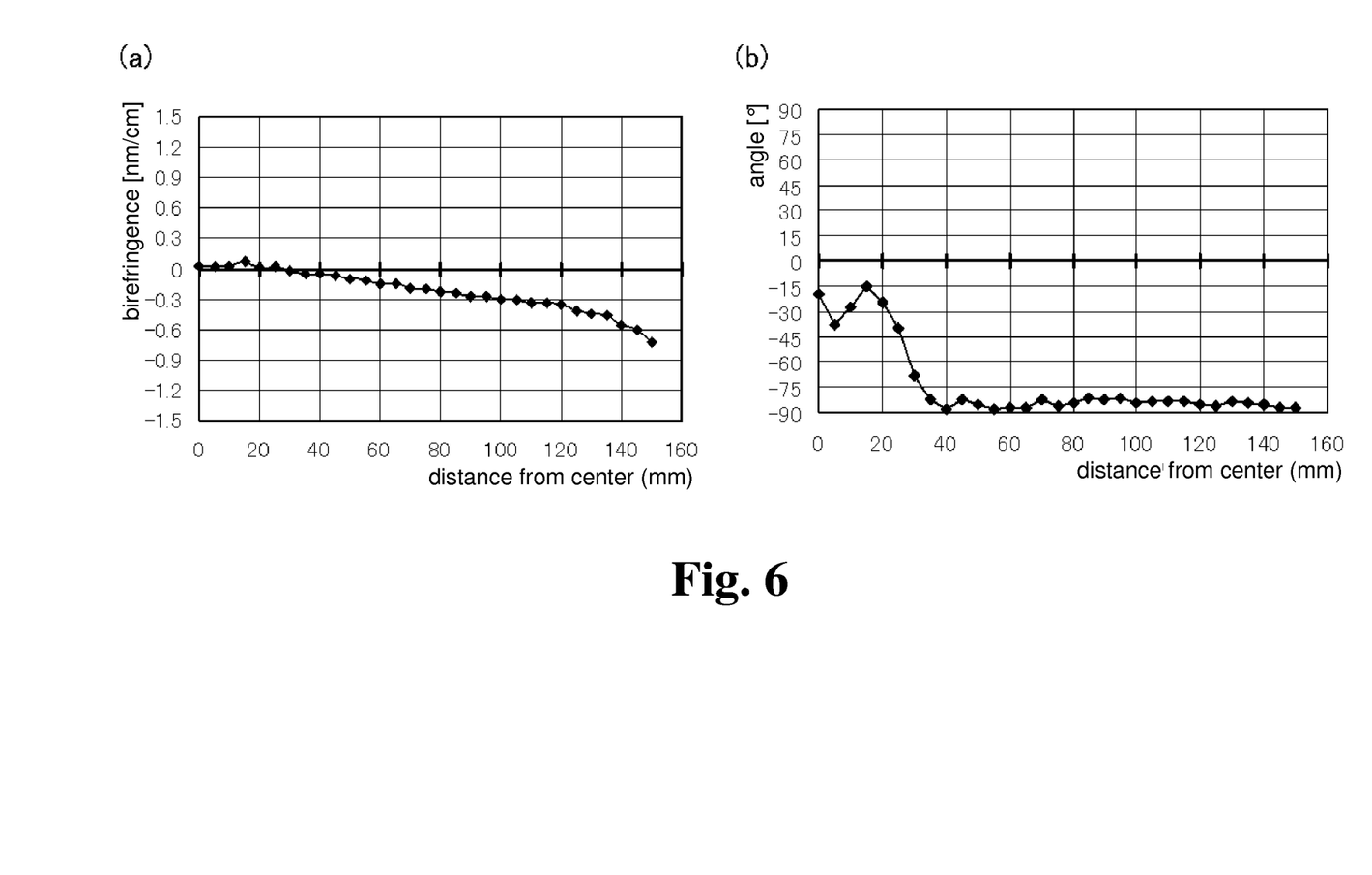
FIG. 6 comprises graph (a) showing the birefringence distribution along the radial direction of the end face, and graph (b) showing the birefringence fast axis angle distribution, in synthetic quartz glass heat-treated in Embodiment 2.

After heat treatment, the birefringence of Embodiment 1 and Embodiment 2 synthetic quartz glass 100 were measured using a birefringence measurement instrument (light source of wavelength 633 nm) manufactured by Uniopt, which afforded birefringence values (phase differences) as shown in the graphs of FIG. 5(a) (Embodiment 1) and FIG. 6(a) (Embodiment 2), respectively. The graphs show the birefringence values at each location as signed absolute values. The sign denotes the direction of the fast axis. A positive value denotes an angle of +45° to −45° to the radial direction (angle range A, radial direction in FIG. 3), and a negative value denotes an angle of +135° to +45°, or −45° to −135°, to the radial direction (angle range B, radial direction in FIG. 3). Also, the birefringence fast axis angle distribution in synthetic quartz glass 100 of Embodiment 1 and Embodiment 2 are shown in the graphs of FIG. 5(b) (Embodiment 1) and FIG. 6(b) (Embodiment 2), respectively.

Figure 12:
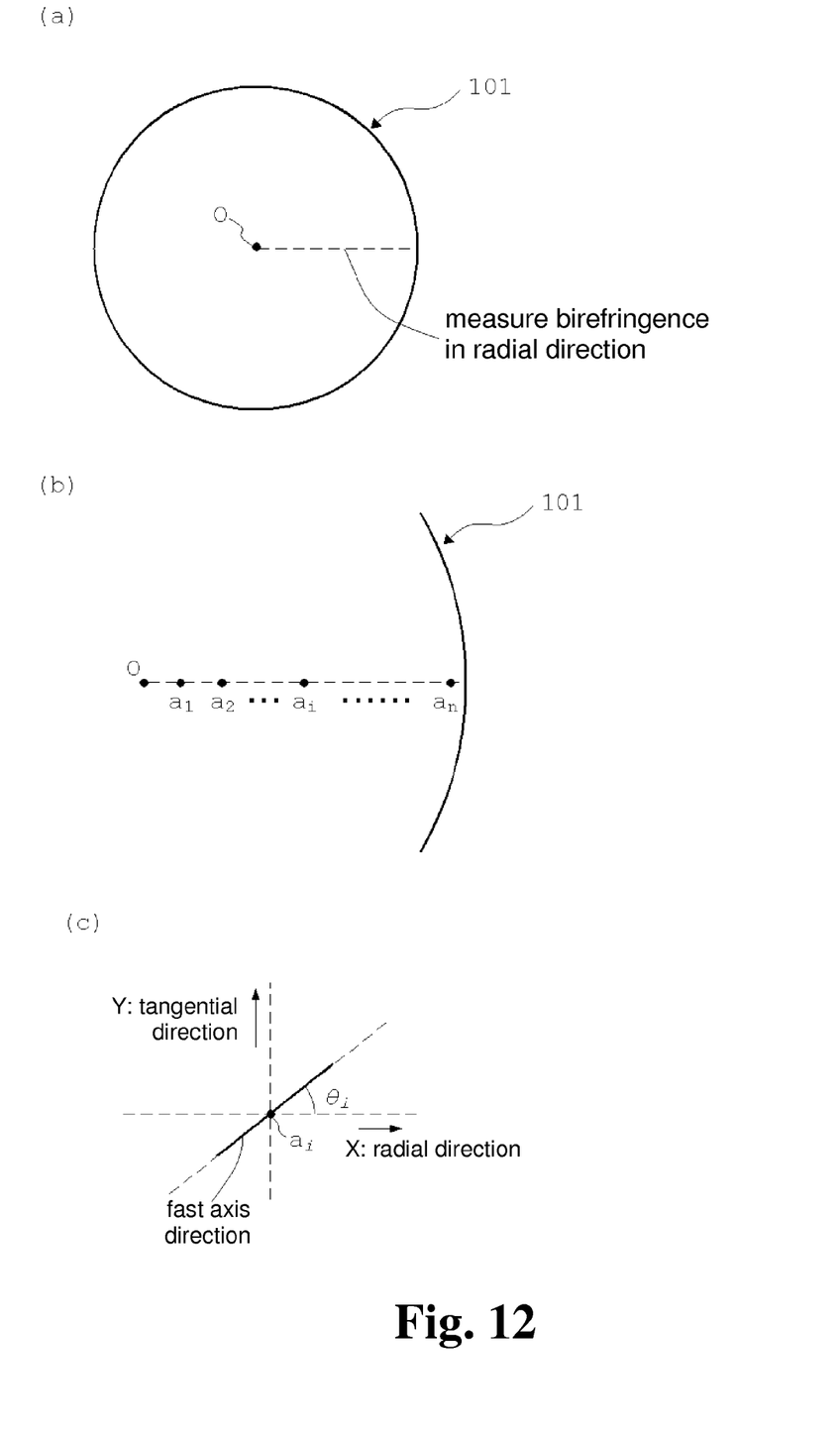
FIG. 12 comprises diagrams to illustrate the definition of birefringence fast axis direction in synthetic quartz glass.

FIG. 12 comprises diagrams to illustrate the definition of birefringence fast axis direction in one synthetic quartz glass 101. FIG. 12(a) shows the aspect viewed from the top face of synthetic quartz glass 101. FIG. 12(b) is an expanded view showing one radial direction from center O, magnified. As shown in FIG. 12(a), (b), when the synthetic quartz glass 101 radial direction birefringence is measured, the birefringence measurement points in one radial direction through center O are $a_1, a_2, \ldots, a_i, \ldots, a_n$ from the center measurement.

The birefringence fast axis direction at measurement point $a_1$ is defined with reference to FIG. 12(c). For convenience, at measurement point $a_1$ the radial direction (radiation direction) is labelled direction X and the tangential direction (concentric direction) is labelled direction Y, as shown in FIG. 12(c). The fast axis direction is at angle $\theta_i$ to direction X. Here, if the size of the birefringence (phase difference) is $Re_i$, birefringence at measurement point $a_1$ can be split into its radial direction component and tangential direction component as follows.

Radial direction component=$Re_i \cdot \cos \theta_i$

Tangential direction component=$Re_i \cdot \sin \theta_i$

The birefringence fast axis direction in one synthetic quartz glass 101 is defined by comparing the mean values of said radial direction component and tangential direction component measured at each measurement point in the radial direction $a_1, a_2, \ldots, a_i, \ldots, a_n$.

In one synthetic quartz glass 101, the mean value of the radial direction component of the birefringence size is expressed as follows.

$$\frac{\sum_{i=1}^{n} Re_i \cdot \cos \theta_i}{n} \qquad \text{[Mathematical expression 1]}$$

In one synthetic quartz glass 101, the mean value of the tangential direction component of the birefringence size is expressed as follows.

$$\frac{\sum_{i=1}^{n} \text{Re}_i \cdot \sin\theta_i}{n}$$

[Mathematical expression 2]

Said mean values are compared, and when the ratio is 2:1 or higher, the fast axis direction of synthetic quartz glass 101 is defined as the 2 or greater component in the ratio.

Calculating in this manner, in Embodiment 1 the radial direction component mean value is 0.29 nm/cm and the tangential direction component mean value is 0.05 nm/cm, thus the radial direction is the birefringence fast axis direction of the heat-treated synthetic quartz glass. In Embodiment 2 the radial direction component mean value is 0.03 nm/cm and the tangential direction component mean value is 0.23 nm/cm, thus the tangential direction is the birefringence fast axis direction of the heat-treated synthetic quartz glass.

It should be noted that although birefringence measured at wavelength 633 nm does not correspond exactly to birefringence in ultraviolet light, the birefringence fast axis direction tends to be the same. When using light of shorter wavelength than the measurement wavelength, as in ultraviolet light, the birefringence phase difference tends to be greater, but the fast axis direction does not change.

In synthetic quartz glass 100 heat-treated in Embodiment 1 and Embodiment 2 it was possible to regulate the birefringence fast axis direction by means of one heat treatment without particular limitation on the OH group concentration distribution in the starting material.

Embodiment 1 and Embodiment 2 show that it is possible to treat a plurality of synthetic quartz glass 100 under different thermal insulation conditions in the same oven, in the same batch; they also show that two types of synthetic quartz glass 100 having different fast axis directions can be obtained.

Embodiment 3

Synthetic quartz glass 100 of external diameter 350 mm and thickness 70 mm was housed in quartz glass ring-shaped thermal insulator 33 of internal diameter 590 mm, and quartz powder was packed to a thickness of 2 mm in the gap between synthetic quartz glass 100 topside end face 102 and top thermal insulator 32, to a thickness of 2 mm in the gap between underside end face 101 and bottom thermal insulator 31, and to a thickness of 120 mm in the gap between lateral face 103 and ring-shaped thermal insulator 33. As in heat treatment oven (air oven) 11 shown in FIG. 2, this was placed upon oven member 12 in the heat treatment oven and subjected to the abovementioned heat treatment.

Figure 7:
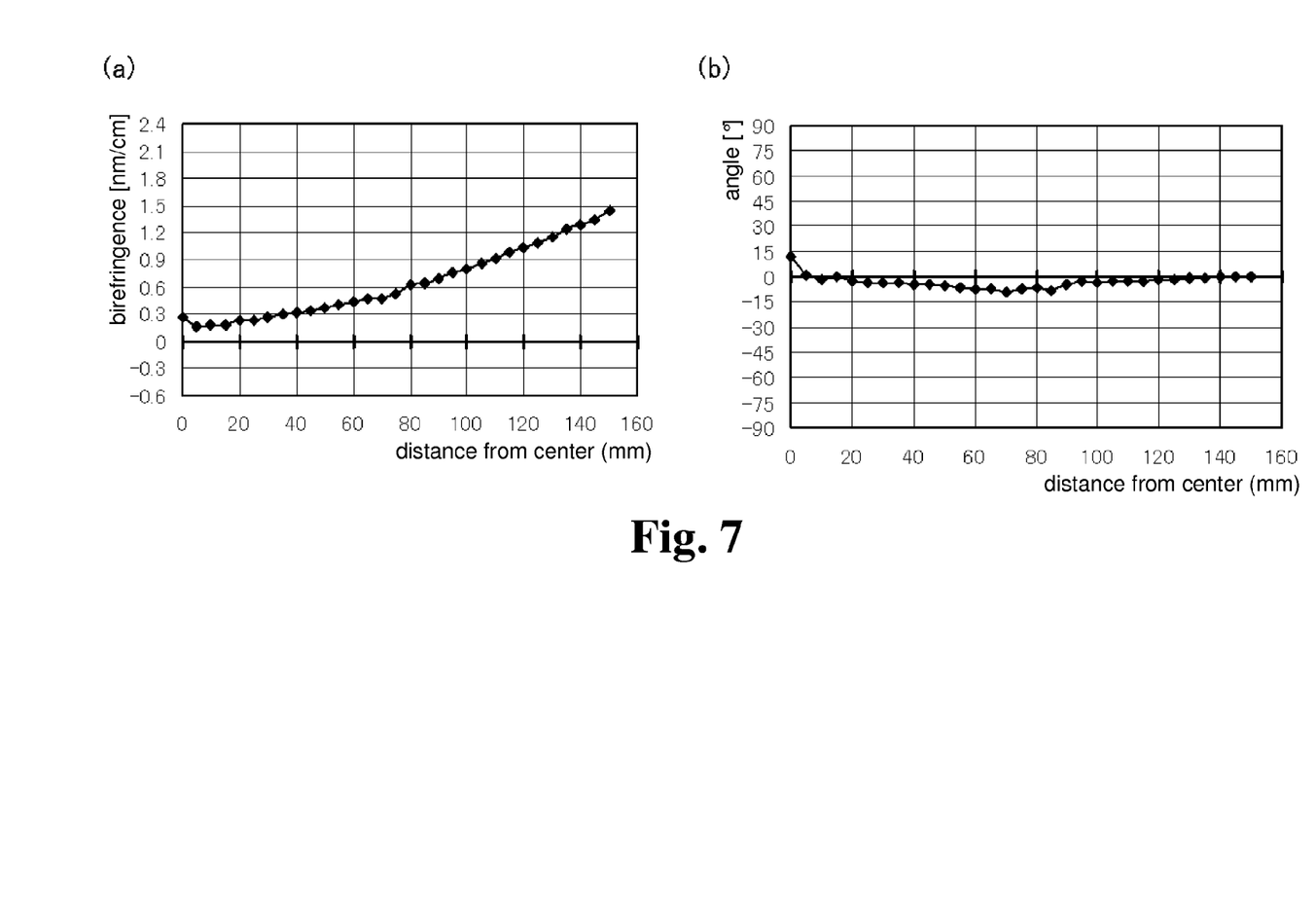
FIG. 7 comprises graph (a) showing the birefringence distribution along the radial direction of the end face, and graph (b) showing the birefringence fast axis angle distribution, in synthetic quartz glass heat-treated in Embodiment 3, FIG. 8 comprises graph (a) showing the birefringence distribution along the radial direction of the end face, and graph (b) showing the birefringence fast axis angle distribution, in synthetic quartz glass heat-treated in Embodiment 4.

Next, birefringence distribution and birefringence fast axis angle distribution were measured as in Embodiment 1 and Embodiment 2; the results were as shown in FIG. 7(*a*), (*b*). The mean values for all measurement points were radial direction component 0.65 nm/cm, tangential direction component 0.04 nm/cm, thus the radial direction was the birefringence fast axis direction.

Embodiment 4

Synthetic quartz glass 100 of external diameter 350 mm and thickness 70 mm was housed in quartz glass ring-shaped thermal insulator 33 of internal diameter 360 mm, and quartz powder was packed to a thickness of 20 mm in the gap between synthetic quartz glass 100 topside end face 102 and top thermal insulator 32, to a thickness of 20 mm in the gap between underside end face 101 and bottom thermal insulator 31, and to a thickness of 5 mm in the gap between lateral face 103 and ring-shaped thermal insulator 33. As in heat treatment oven (air oven) 11 shown in FIG. 2, this was placed upon oven member 12 in the heat treatment oven and subjected to the abovementioned heat treatment.

Figure 8:
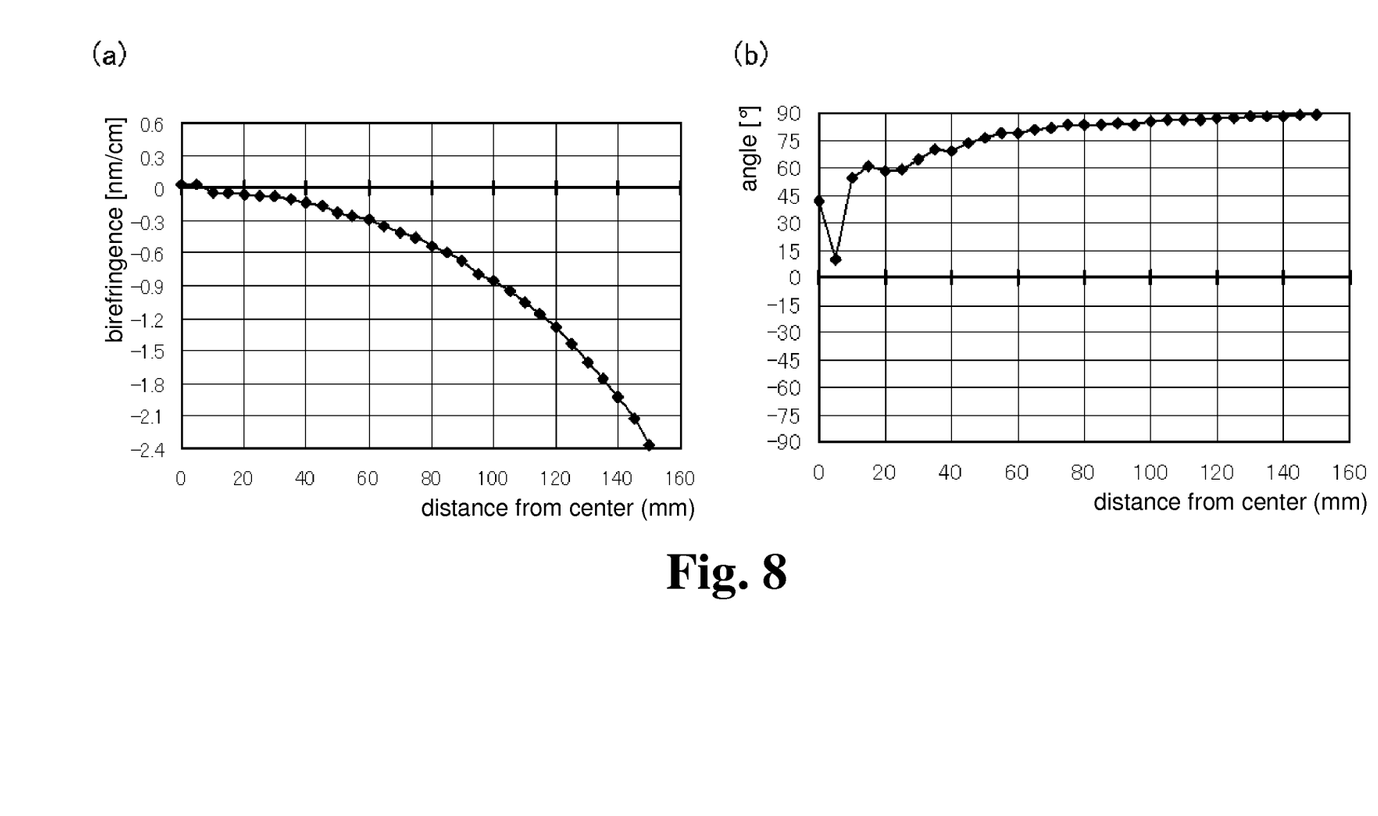

Next, birefringence distribution and birefringence fast axis angle distribution were measured as in Embodiment 1 and Embodiment 2; the results were as shown in FIG. 8(*a*), (*b*). The mean values for all measurement points were radial direction component 0.05 nm/cm, tangential direction component 0.70 nm/cm, thus the tangential direction was the birefringence fast axis direction.

Embodiment 5

First, a lump of the required weight was cut from quartz glass parent material of external diameter 150 mm or greater, and melted, compressed and shaped using a carbon mould to obtain smooth, columnar synthetic quartz glass 100 of dimensions external diameter 350 mm, thickness 70 mm. The resulting synthetic quartz glass 100 was heat-treated (annealing treatment) in heat treatment oven (air oven) 11 provided with heater 13, etc. as shown in FIG. 1.

Synthetic quartz glass 100 of external diameter 350 mm and thickness 70 mm was housed in quartz glass ring-shaped thermal insulator 23 of internal diameter 350 mm, external diameter 530 mm, top thermal insulator 22 was used at a thickness of 5 mm to cover the topside end face of synthetic quartz glass 100, and bottom thermal insulator 21 was used at a thickness of 5 mm to cover the underside. Next, this was placed upon oven member 12 in heat treatment oven (air oven) 11 shown in FIG. 1, and heat-treated using the temperature program shown in FIG. 4. Specifically, this involved increasing the temperature to 1200° C. over a 10-hour period from the start of heating, then keeping the temperature at 1200° C. for 50 hours, and then decreasing the temperature to 1000° C. over a 100-hour period, after which heating using the heater was stopped, and the system was allowed to cool.

Figure 9:
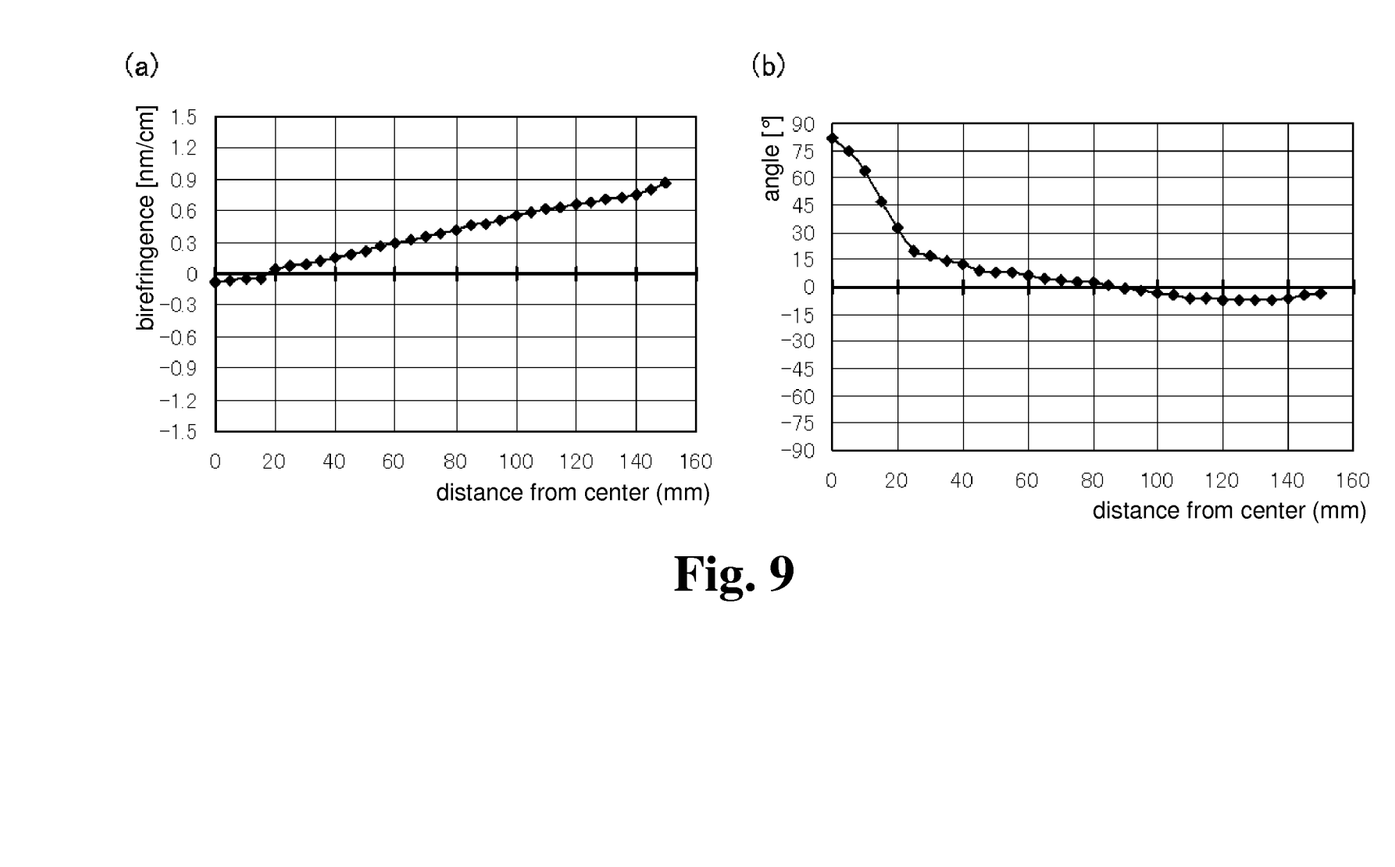
FIG. 9 comprises graph (a) showing the birefringence distribution along the radial direction of the end face, and graph (b) showing the birefringence fast axis angle distribution, in synthetic quartz glass heat-treated in Embodiment 5.

Next, birefringence distribution and birefringence fast axis angle distribution were measured as in Embodiment 1 and Embodiment 2; the results were as shown in FIG. 9(*a*), (*b*). The mean values for all measurement points were radial direction component 0.39 nm/cm, tangential direction component 0.04 nm/cm, thus the radial direction was the birefringence fast axis direction.

Embodiment 6

Heat treatment was performed as in Embodiment 5 except that the thickness of top thermal insulator 22 was changed. Specifically, synthetic quartz glass 100 of external diameter 350 mm and thickness 70 mm was housed in quartz glass ring-shaped thermal insulator 23 of internal diameter 350 mm, external diameter 390 mm, and top thermal insulator 22 was used at a thickness of 20 mm to cover the topside end face of synthetic quartz glass 100, and bottom thermal insulator 21 was used at a thickness of 20 mm to cover the underside. Next, this was placed upon oven member 12 in heat treatment oven (air oven) 11 shown in FIG. 1 and heat-treated using the temperature program shown in FIG. 4.

Figure 10:
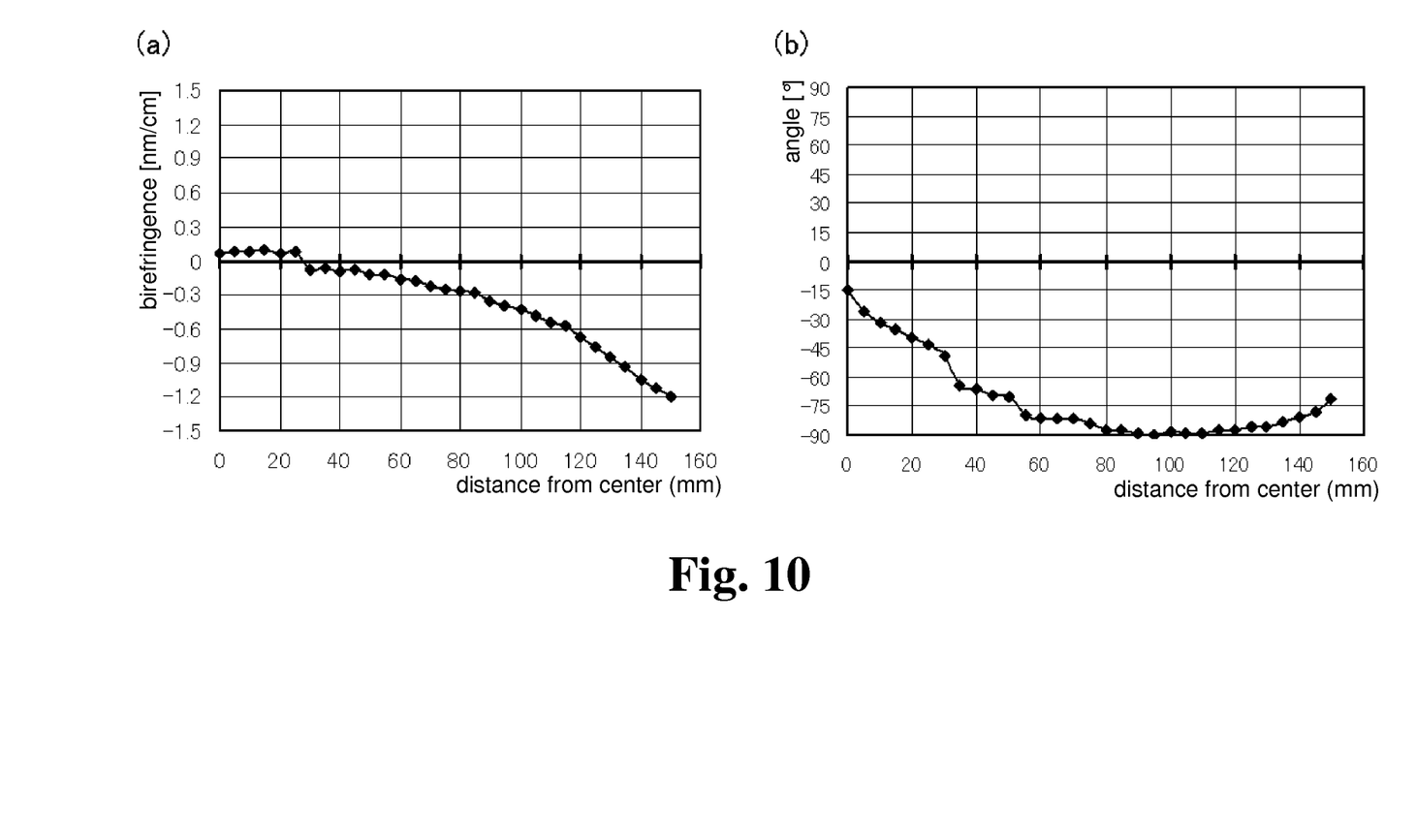
FIG. 10 comprises graph (a) showing the birefringence distribution along the radial direction of the end face, and graph (b) showing the birefringence fast axis angle distribution, in synthetic quartz glass heat-treated in Embodiment 6.

Next, birefringence distribution and birefringence fast axis angle distribution were measured as in Embodiment 1 and Embodiment 2; the results were as shown in FIG. 10(*a*), (*b*). The mean values for all measurement points were radial direction component 0.06 nm/cm, tangential direction component 0.37 nm/cm, thus the tangential direction was the birefringence fast axis direction.

The conditions and results for Embodiments 1 to 6 are shown in Table 1. In Table 1, mm is the unit of the numerical values.

TABLE 1

| Embodiment number | Synthetic quartz glass | | Top thermal insulator thickness | Bottom thermal insulator thickness | Ring-shaped thermal insulator thickness | SiO$_2$ powder thickness | | | Birefringence fast axis direction |
|---|---|---|---|---|---|---|---|---|---|
| | Outer diameter | Thickness | | | | Top | Bottom | Outer circumference | |
| 1 | 350 | 70 | 20 | 20 | 20 | 2  | 2  | 95  | Radial |
| 2 | 350 | 70 | 20 | 20 | 20 | 20 | 20 | 20  | Tangential |
| 3 | 350 | 70 | 20 | 20 | 20 | 2  | 2  | 120 | Radial |
| 4 | 350 | 70 | 20 | 20 | 20 | 20 | 20 | 5   | Tangential |
| 5 | 350 | 70 | 5  | 5  | 90 | —  | —  | —   | Radial |
| 6 | 350 | 70 | 20 | 20 | 20 | —  | —  | —   | Tangential |

Comparative Example

As in Embodiments 1 to 4, a lump of the required weight was cut from quartz glass parent material of external diameter 150 mm or greater, and melted, compressed and shaped using a carbon mould to obtain smooth, columnar synthetic quartz glass of dimensions external diameter 350 mm, thickness 70 mm. This synthetic quartz glass was insulated using a quartz glass container and quartz glass powder with no particular regulation of the insulation effects, and heat-treated as commonly performed to increase homogeneity and decrease birefringence.

Figure 11:
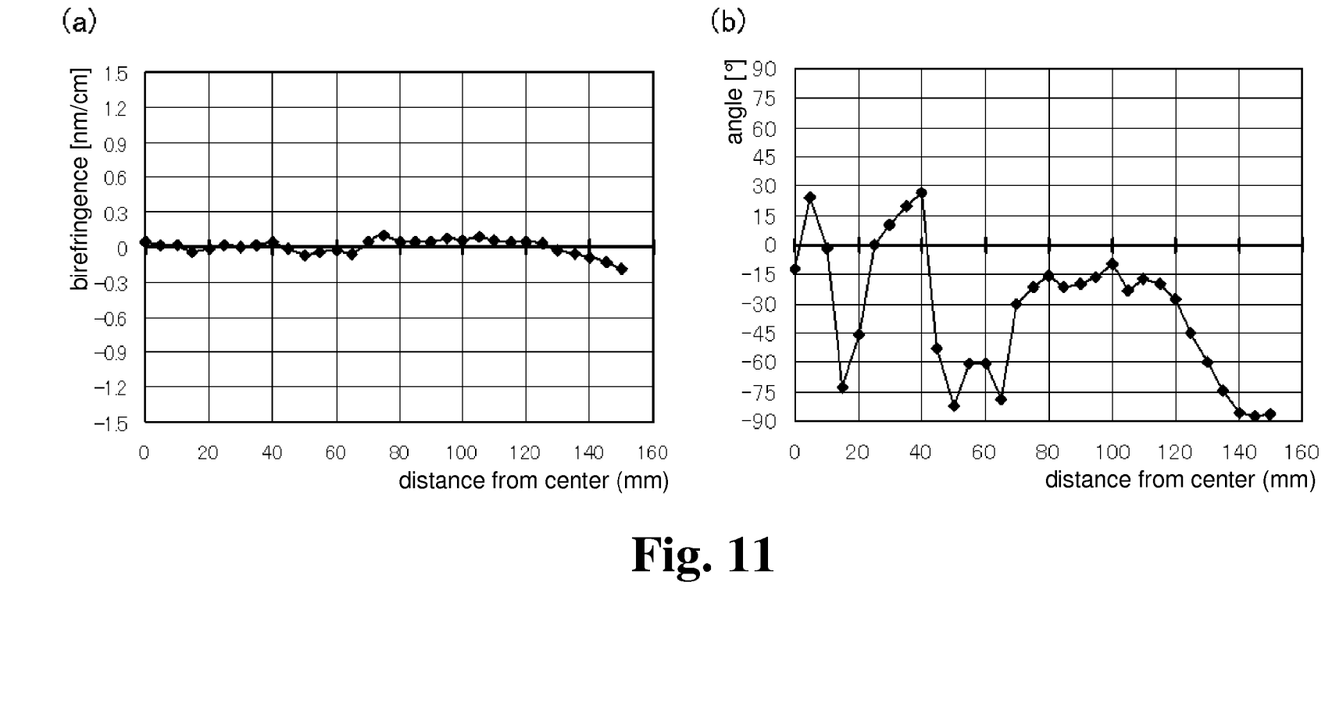
FIG. 11 comprises graph (a) showing the birefringence distribution along the radial direction of the end face, and graph (b) showing the birefringence fast axis angle distribution, in synthetic quartz glass in which birefringence was decreased according to the Comparative example.

Next, birefringence distribution and birefringence fast axis angle distribution were measured as in Embodiment 1; the results were as shown in FIG. 11(a), (b). Specifically, the birefringence value decreased overall and synthetic quartz glass of high homogeneity was obtained, but in the radial direction the birefringence fast axis direction (sign) changed many times even outside the central region, thus the birefringence fast axis distribution was not regulated.

It should be noted that the present invention is not limited by the abovementioned mode. The abovementioned mode is merely an example; anything having essentially the same configuration as the technical idea described in the scope of the patent claims of the present invention that achieves the same function effect is included in the technical scope of the present invention.

LEGEND

11 Heat treatment oven
12 Oven member
13 Heater
21, 31 Bottom thermal insulator (end face thermal insulator)
22, 32 Top thermal insulator (end face thermal insulator)
23, 33 Ring-shaped thermal insulator (lateral face thermal insulator)
34 Gap-packing thermal insulator
100 Synthetic quartz glass
101 End face (bottom face)
102 End face (top face)
103 Lateral face

The invention claimed is:

1. A heat treatment method for synthetic quartz glass, said method comprising:

heat treating a columnar synthetic quartz glass article having two opposing end faces and a lateral face covered with thermal insulator;

wherein said thermal insulator has an end-face thermal insulator that covers said two end faces, and a lateral-face thermal insulator that covers said lateral face, said end-face and lateral face thermal insulators each having a respective type or thickness, wherein at least either said types or said thicknesses differ so as to afford different thermal insulation effects so as to regulate a birefringence fast axis direction of said synthetic quartz glass article either in a tangential direction or in a radial direction such that after the heat treating the synthetic quartz glass article a. has a regulated distribution of said birefringence fast axis direction, and b. has birefringence such that either a radial/tangential ratio of a radial mean value to a tangential mean value or a tangential/radial ratio of the tangential mean value to the radial mean value is 2:1 or greater, wherein the radial mean value is according to the formula $$\frac{\sum_{i=1}^{n} \text{Re}_i \cdot \cos\theta_i}{n}$$

and the tangential mean value is according to the formula $$\frac{\sum_{i=1}^{n} \text{Re}_i \cdot \sin\theta_i}{n}$$

for a number n of measurements of respective magnitudes of birefringence ($\text{Re}_i$) and of respective angles ($\theta_i$) of the fast axis direction relative to a radius at respective measurement points ($a_i$) on the synthetic quartz glass article; and wherein, when the tangential mean value is higher than the radial mean value, the fast axis direction of said synthetic quartz glass article is the tangential direction, and, when the radial mean value is higher than the tangential mean value, the fast axis direction of said synthetic quartz glass article is the radial direction; and wherein the birefringence fast axis direction of said synthetic quartz glass article is regulated in a tangential direction of said end face by causing the thermal insulation effect of said end face thermal insulator to be greater than the thermal insulation effect of said lateral face thermal insulator.

2. The heat treatment method for synthetic quartz glass as claimed in claim 1, wherein said thermal insulator is a quartz glass container that is configured to house said synthetic quartz glass article.

3. The heat treatment method for synthetic quartz glass as claimed in claim 2, wherein $SiO_2$ powder or $SiO_2$ fibers are packed inside said quartz glass container.

4. The synthetic quartz glass heat treatment method as claimed in claim 1, wherein said synthetic quartz glass is optical synthetic quartz glass configured to be used in an optical system in an exposure apparatus.

5. A heat treatment method for synthetic quartz glass, said method comprising:
heat treating a first columnar synthetic quartz glass article having two opposing end faces and a lateral face covered with thermal insulator;
wherein said thermal insulator has an end-face thermal insulator that covers said two end faces, and a lateral-face thermal insulator that covers said lateral face,
said end-face and lateral face thermal insulators each having a respective type or thickness, wherein at least either said types or said thicknesses differ so as to afford different thermal insulation effects so as to regulate a birefringence fast axis direction of said synthetic quartz glass article either in a tangential direction or in a radial direction such that after the heat treating the synthetic quartz glass article
a. has a regulated distribution of said birefringence fast axis direction, and
b. has birefringence such that either a radial/tangential ratio of a radial mean value to a tangential mean value or a tangential/radial ratio of the tangential mean value to the radial mean value is 2:1 or greater,
wherein the radial mean value is according to the formula $$\frac{\sum_{i=1}^{n} \text{Re}_i \cdot \cos\theta_i}{n}$$

and the tangential mean value is according to the formula $$\frac{\sum_{i=1}^{n} \text{Re}_i \cdot \sin\theta_i}{n}$$

for a number n of measurements of respective magnitudes of birefringence ($Re_i$) and of respective angles ($\theta_i$) of the fast axis direction relative to a radius at respective measurement points ($a_i$) on the synthetic quartz glass article; and
wherein, when the tangential mean value is higher than the radial mean value, the fast axis direction of said synthetic quartz glass article is the tangential direction, and, when the radial mean value is higher than the tangential mean value, the fast axis direction of said synthetic quartz glass article is the radial direction; and
wherein a second columnar synthetic quartz glass article is prepared having respective end faces and a respective lateral side with a respective end face thermal insulator that covers said two end faces and a respective lateral face thermal insulator that covers said lateral face, and said synthetic quartz glass articles are heat-treated simultaneously using a single heat treatment oven; and
wherein, the end face thermal insulator and the lateral face thermal insulator for said second synthetic quartz glass article have thermal insulation effects that differ from the thermal insulation effects of said end face thermal insulator and lateral face thermal insulator for the first synthetic quartz glass article, and said second synthetic quartz glass article has a birefringence fast axis direction that is regulated so as to be in a direction different from to that of the birefringence fast axis of said first synthetic quartz glass article.

6. The synthetic quartz glass heat treatment method as claimed in claim 5, wherein said synthetic quartz glass is optical synthetic quartz glass configured to be used in an optical system in an exposure apparatus.

7. The heat treatment method for synthetic quartz glass as claimed in claim 6, wherein the birefringence fast axis direction of said first synthetic quartz glass article is regulated in a radial direction of said end face by causing the thermal insulation effect of said end face thermal insulator to be smaller than the thermal insulation effect of said lateral face thermal insulator.

8. The heat treatment method for synthetic quartz glass as claimed in claim 5, wherein for each of the synthetic quartz glass articles the respective thermal insulator is a quartz glass container that houses said synthetic quartz glass article.

9. The heat treatment method for synthetic quartz glass as claimed in claim 8, wherein $SiO_2$ powder or $SiO_2$ fibers are packed inside said quartz glass containers.

* * * * *